(12) United States Patent
Holzheu

(10) Patent No.: US 7,556,295 B2
(45) Date of Patent: Jul. 7, 2009

(54) AXIAL AND RADIAL PLAY AND ANGLE COMPENSATION OF A TOLERATING PIPE CONNECTION

(75) Inventor: Peter Ludwig Holzheu, Königsbrunn (DE)

(73) Assignee: Fey Lamellenringe GmbH & Co., KG, Konigsbrunn (DE)

( * ) Notice: Subject to any disclaimer, the term of this patent is extended or adjusted under 35 U.S.C. 154(b) by 229 days.

(21) Appl. No.: 11/661,697

(22) PCT Filed: Feb. 17, 2005

(86) PCT No.: PCT/EP2005/001605

§ 371 (c)(1), (2), (4) Date: Mar. 2, 2007

(87) PCT Pub. No.: WO2005/082131

PCT Pub. Date: Sep. 9, 2005

(65) Prior Publication Data

US 2008/0100059 A1    May 1, 2008

(51) Int. Cl.
*F16L 27/00* (2006.01)
*F16L 21/06* (2006.01)

(52) U.S. Cl. ............... 285/224; 285/147.1; 285/231; 285/370; 285/397

(58) Field of Classification Search .......... 285/145.3, 285/146.1, 147.1, 224, 231, 370, 397
See application file for complete search history.

(56) References Cited

U.S. PATENT DOCUMENTS

| | | | | |
|---|---|---|---|---|
| 3,224,798 A | * | 12/1965 | Hausmann | 285/179 |
| 3,807,772 A | * | 4/1974 | Delisle et al. | 285/41 |
| 4,170,365 A | * | 10/1979 | Haaland | 277/605 |
| 4,475,750 A | * | 10/1984 | Campbell | 285/95 |
| 4,482,171 A | * | 11/1984 | Campbell | 285/95 |
| 4,553,775 A | * | 11/1985 | Halling | 285/55 |
| 4,593,941 A | * | 6/1986 | Whightsil, Sr. | 285/145.5 |
| 4,613,170 A | * | 9/1986 | Kersting | 285/187 |
| 5,106,129 A | * | 4/1992 | Camacho et al. | 285/233 |
| 5,671,954 A | * | 9/1997 | Cheramie | 285/281 |
| 6,059,323 A | * | 5/2000 | Ekholm et al. | 285/224 |

(Continued)

FOREIGN PATENT DOCUMENTS

DE    32 41 750 A1    5/1984

(Continued)

*Primary Examiner*—James M Hewitt
(74) *Attorney, Agent, or Firm*—Barnes & Thornburg LLP

(57) ABSTRACT

A pipe connection for exhaust pipes of internal-combustion engines. The pipe connection includes an axial and radial plug and an angle compensation. The pipe connection further includes a first pipe, a second pipe and an interior part at an end of the first pipe. The interior part is enveloped by a bell part at an end of the second pipe. The pipe connection further includes at least one lamellar ring held in an annular groove in either a) a radially outer surface of the interior part or b) a radially inner surface of the bell part. The at least one lameller ring is tensioned against either a) the radially outer surface of the interior part or b) the radially inner surface of the bell part. Either a) the radially outer surface of the interior part or b) the radially inner surface of the bell part is constructed as a concave surface. The at least one lameller ring is tensioned against the concave surface.

10 Claims, 4 Drawing Sheets

U.S. PATENT DOCUMENTS

| | | | |
|---|---|---|---|
| 6,328,352 B1 * | 12/2001 | Geppert et al. | 285/373 |
| 6,709,024 B1 * | 3/2004 | Swinford et al. | 285/233 |
| 6,905,144 B2 * | 6/2005 | Vila | 285/223 |
| 2008/0012293 A1 * | 1/2008 | Freiberger et al. | 285/133.11 |

FOREIGN PATENT DOCUMENTS

| | | |
|---|---|---|
| DE | 41 36 799 A1 | 5/1993 |
| GB | 2083154 A * | 3/1982 |

* cited by examiner

AXIAL AND RADIAL PLAY AND ANGLE COMPENSATION OF A TOLERATING PIPE CONNECTION

BACKGROUND AND SUMMARY

The present disclosure relates to a pipe connection tolerating or having an axial and radial play as well as an angle compensation. The pipe connection more particularly relates to a pipe connection in exhaust pipes of internal-combustion engines. The pipe connection includes an interior part which is constructed at the end of one pipe and which is enveloped by a bell part at the end of another pipe. At least one lamellar ring is held in an annular groove in the radially outer surface of the interior part or in the radially inner surface of the bell part. The at least one lamellar ring is tensioned against the radially inner surface of the bell part or against the radially outer surface of the interior part. The radially inner surface of the bell part and/or the radially outer surface of the interior part are constructed as a spherical segment surface, which is concave with respect to the lamellar ring, or as a concavely spherical surface. The at least one lamellar ring is tensioned against the spherical segment surface or the spherical surface.

A sealing of the pipe connection with no leakage or an extremely low leakage of environmentally hazardous mediums, such as exhaust gases of internal-combustion engines, is becoming increasingly important against the background of a raised environmental awareness and legal regulations, such as the Air Ordinance TA 2003 or the VDI Standard 2440.

The at least one lamellar ring is directed to sealing off the pipe connection as hermetically as possible with respect to the environment. Such lamellar rings include a thin steel band or are made of another material, are constructed simply and require a small installation space in the axial as well as in the radial direction. They can, therefore, easily be retrofitted into existing pipe connections. In addition, because of their conventional metal construction, they are heat-resistant and break-proof and are therefore excellently suitable for sealing a pipe connection with respect to aggressive and high-temperature mediums. As a result, they are advantageous as sealing devices in exhaust pipe connections, particularly with respect to hot engine exhaust gases of temperatures of up to 730° C.

The effect of such a lamellar ring is based on the same effect as occurs in the case of diaphragm seals. That is, it deflects the flow away from the working diameter toward the groove base and, because of the very small still exposed gap, forms a throttle there, at which pressure energy is lost. As a result of the flow deflection and the throttling, the lamellar ring reduces a high pressure level to a low level and reduces a flow past the working diameter.

A pipe connection is known from German Patent Document DE 41 36 799 C2, where the radially inner circumferential surface of the bell part, as well as the radially outer circumferential surface of the interior part, are cylindrical and several lamellar rings are held in outer grooves of the interior part. A small clear gap exists between the groove base of the outer grooves and the radially inner circumferential surface of the lamellar rings. On the other hand, as a result of the prestressing caused by their outside diameters, which are greater than the radially inner circumferential surface of the bell part, the lamellar rings rest sealingly against the bell part by their radially outer circumferential surface. This permits a certain axial and radial play as well as an angle compensation between the two pipes.

Especially because of the fact that nowadays a large number of assemblies are crammed into the engine compartment and the engine movements of self-ignition internal-combustion engines are often large, it is necessary that pipe connections in exhaust pipes of internal-combustion engines have constructions that are as flexible as possible. This requirement with respect to pipe connections exists also in other fields of technology.

From German Patent Document DE 32 41 750 A1, a pipe connection is known which, with the exception of a radial gap, corresponds to the pipe connection of the initially mentioned type. In such a case, the radially inner surface of the bell part and the radially exterior surface of the interior part are constructed as spherical segment surfaces concave with respect to the lamella ring. In this case, the at least one lamellar ring is accommodated in an annular groove of the interior part and is tensioned against the spherical segment surface of the bell part. However, no radial compensation is provided between the interior part constructed as a sliding ring and the exterior part constructed as a slide bush. Thus, during the mounting, the sliding ring bush has to be forced open by a suitable tool in order to then slide the two bush halves axially over the sliding ring and then join them again.

The present disclosure relates to a pipe connection configured such that it can be mounted easily and includes desirable tightness properties.

The present disclosure is related to a pipe connection for exhaust pipes of internal-combustion engines. The pipe connection includes an axial and radial plug and an angle compensation. The pipe connection further includes a first pipe, a second pipe and an interior part at an end of the first pipe. The interior part is enveloped by a bell part at an end of the second pipe. The pipe connection further includes at least one lamellar ring held in an annular groove in either a) a radially outer surface of the interior part or b) a radially inner surface of the bell part. The at least one lameller ring is tensioned against either a) the radially outer surface of the interior part or b) the radially inner surface of the bell part. One of a) the radially outer surface of the interior part and b) the radially inner surface of the bell part are constructed as a concave surface. The at least one lameller ring is tensioned against the concave surface. Further included is at least one tensioning ring that is supported on a groove base and is held in the annular groove. The at least one tensioning ring generates an elastic prestressing of the at least one lameller ring against either a) the radially outer surface of the interior part or b) the radially inner surface of the bell part.

Regarding the pipe connection, according to the present disclosure as noted above, the radially inner surface of the bell part and/or the radially outer surface of the interior part is/are constructed as a spherical segment surface concave with respect to the lamellar ring, or as a concavely spherical surface. The at least one lamellar ring is tensioned against the spherical segment surface or the spherical surface, which then forms the so-called working diameter of the lamellar ring. In this case, the prestressing of the at least one lamellar ring provides a gap-free sealing with respect to the working diameter, while a small gap is left free toward the groove base of the annular groove. As a result, a ball-and-socket joint is essentially implemented at the pipe ends and is sealed by lamellar rings. In such a case, the lamellar rings now essentially follow a circular path when one pipe is moved relative to the other pipe in an angular manner.

Depending on the radius of the pipes and of the spherical segment surfaces, a significantly greater angle compensation can thereby be implemented. An axial and radial play or compensation can also take place between both pipes. That is because during a relative movement of the two pipes in the axial or radial direction, the at least one lamellar ring can deflect toward the groove base when the working diameter situated opposite the annular groove is reduced because of the relative movement.

According to the present disclosure, a tensioning ring supported at the groove base is held in the annular groove, which tensioning ring generates an elastic prestressing of the at least one lamellar ring against the radially inner surface of the bell part or against the radially outer surface of the interior part.

On the one hand, the sealing effect is thereby increased. On the other hand, the elastic prestressing centers the bell part with respect to the interior part. This is desired particularly in the case of vibration-stressed pipe connections, such as exhaust gas systems of motor vehicle internal-combustion engines. The reason is that there is a risk that the connection between the bell part and the interior part, which has radial play because of the required compensating movements, is excited to carry out vibrations such that the bell part impacts on the interior part and thereby causes undesirable noise and damage.

In contrast, the prestressing exercised by the tensioning ring provides that, although during the mounting of the pipe connection radial compensation can take place as a result of elastic deformations of the tensioning ring, under the effect of a dynamic load, with a corresponding design of the tensioning ring, a direct contact is avoided between the bell part and the interior part.

In view of an operating temperature range of, for example, minus 30° C. outside temperature up to approximately 700° C. of the exhaust gas guided through the pipe connection, the prestressing generated by the tensioning ring also provides a compensation of heat-caused deformations of the pipe connection parts, particularly of the lamellar rings.

In an embodiment of the present disclosure, the at least one lamellar ring is held in an outer groove of the interior part and is tensioned against the radial inner circumferential surface of the bell part. The radially inner surface of the bell part and the radially outer surface of the interior part are constructed as concave spherical-segment surfaces with the same curvature direction. A good guidance or contact of the interior part onto the exterior part is obtained if the radii of the spherical segment surfaces or of the spherical surfaces are essentially identical.

Several lamellar rings may be arranged axially behind one another in the annular groove, which has a favorable effect with a view to a multiple deflection of the flow of the pressure medium. When several lamellar rings are arranged in the annular groove, those of the same type are used. Because of the construction as a spherical-segment surface or as a spherical surface, the lamellar rings will then each have different outside diameters when they rest on the working diameter, which equals a wide elastic sealing. The more such lamellar rings are held in an annular groove, the better the close contact on the working diameter.

In such a case, for example, one or more single-wound lamellar rings can be used which have an axial abutting opening and are made of a steel band extending in a plane. Such single-wound lamellar rings can be produced cost-effectively, and their prestressing against the groove base or against the working diameter is easily preadjustable.

In accordance with to another embodiment of the present disclosure, double-wound lamellar rings are used. In the relaxed condition of the double-wound lamellar ring, the ends of the double windings project toward the inside or outside deviating from a circular shape formed by the remainder of the double-wound lamellar ring. In addition, in the tensioned condition of the double-wound lamellar ring, the ends of the double windings are aligned with this circular shape. The ends, which project to the inside or outside with respect to the circular shape, will then have the effect that the double windings are pressed toward the outside or toward the inside in the installed condition. The roundness of the closed double winding over 360 degrees ensures a firm contact with the groove base of the annular groove or with the working diameter.

An interior part and/or the bell part can be produced as separate components and can be fastened to the ends of one pipe and/or of the other pipe by, for example, welding.

Other aspects of the present disclosure will become apparent from the following descriptions when considered in conjunction with the accompanying drawings.

DETAILED DESCRIPTION

Figure 1:
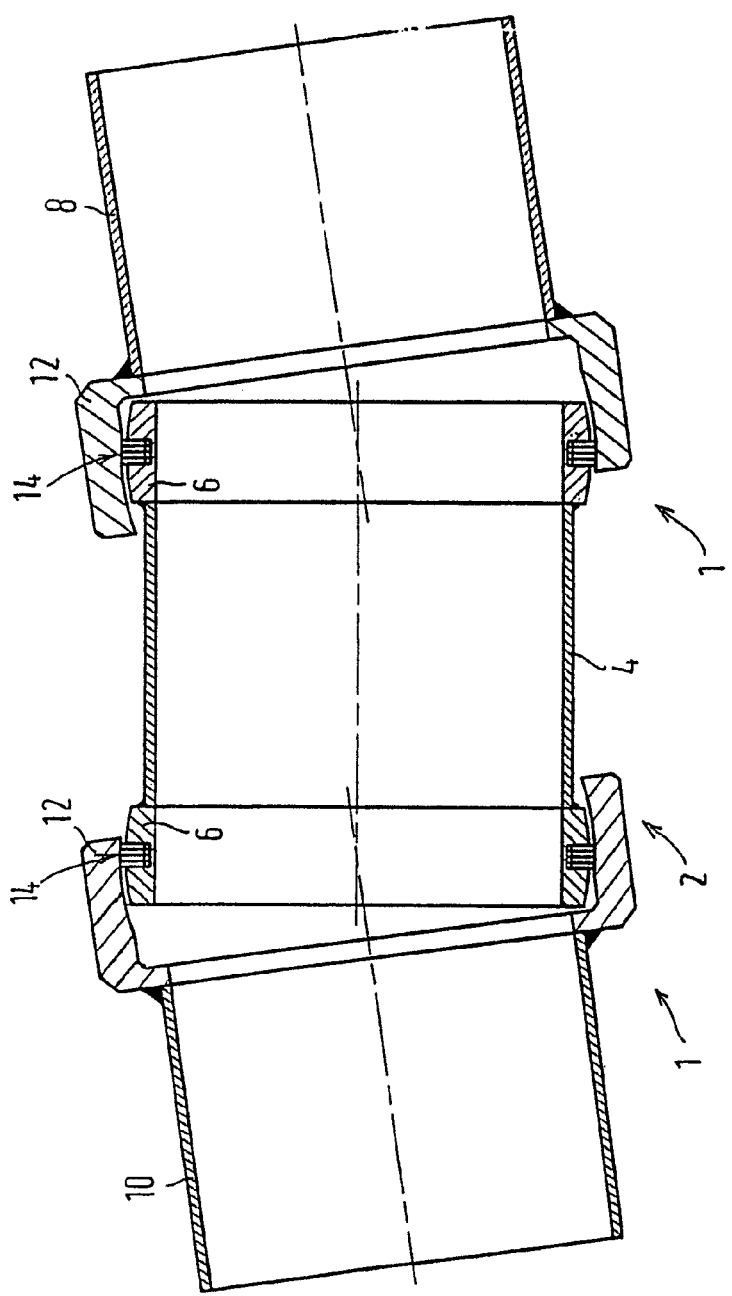
FIG. 1 is a cross-sectional view of a double-jointed connection between two pipes in an angled position, according to the present disclosure.

FIG. 1 illustrates pipe connections 1 of an exhaust pipe of an internal-combustion engine, which tolerate an axial and radial play as well as an angle compensation, according to an embodiment of the present disclosure. The pipe connections 1 are implemented in a double-jointed connection 2, also called "bone" in technical terminology. The double-jointed connection 2 includes an intermediate pipe 4 with interior parts 6 arranged at an end of a side. Interior parts 6 are each surrounded by a bell part 12 arranged at the end on exhaust pipes 8, 10 respectively. The interior parts 6 and/or the bell parts 12 may be produced as separate components and may be fastened to the ends of the exhaust pipes 8, 10 and of the intermediate pipe 4 by, for example, welding. The pipe connections 1 have identical constructions, so that only one of the pipe connections 1 will be described in the following.

Figure 2:
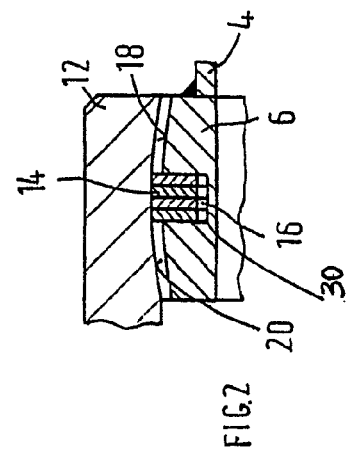
FIG. 2 is an enlarged view of the pipe connection of FIG. 1 in a straight position.
Figure 3:
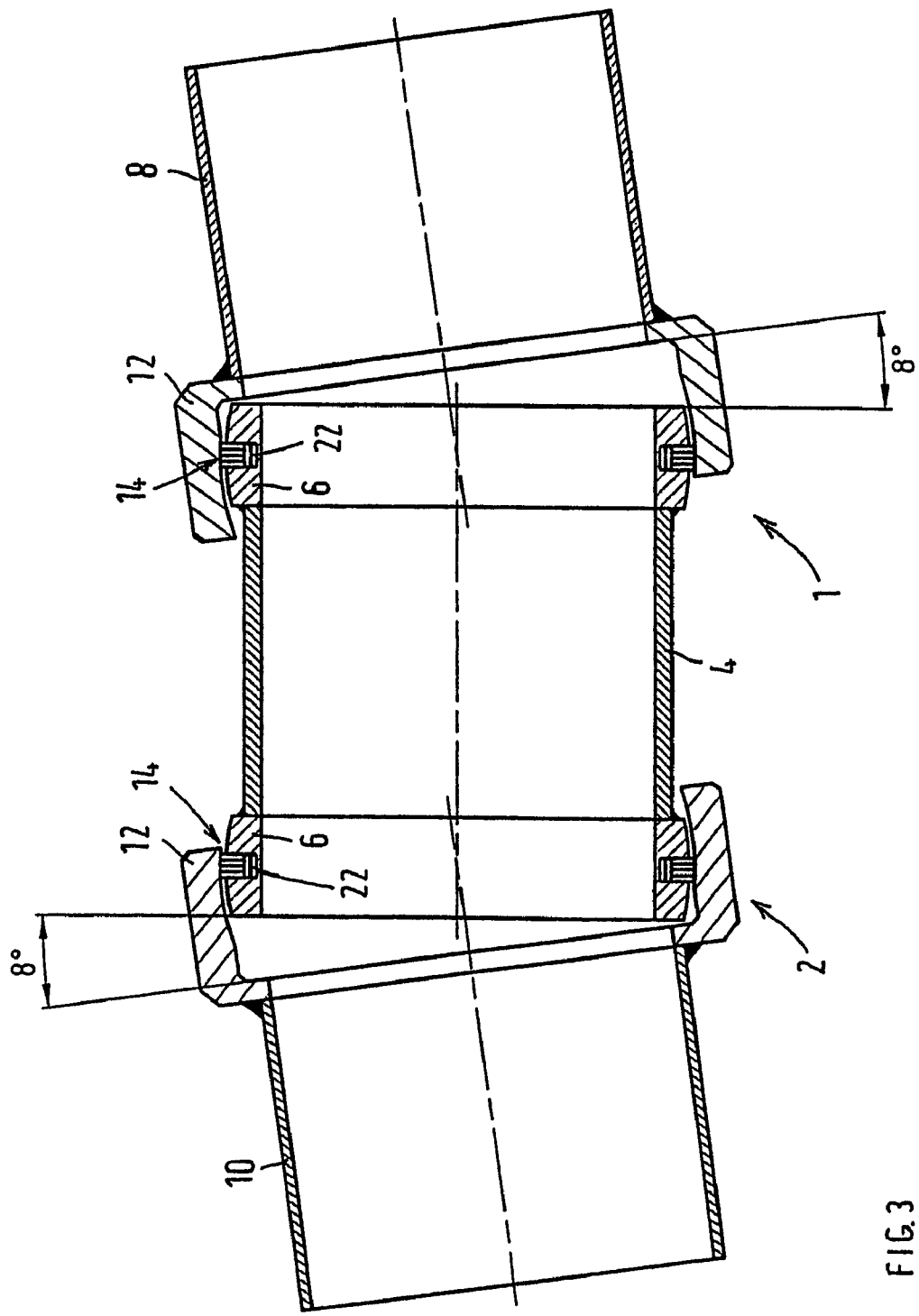
FIG. 3 is a cross-sectional view of a double-jointed connection between two pipes having a tensioning ring, according to the present disclosure.

At least one lamellar ring 14, or four lamellar rings, as shown, for example, in FIGS. 1 and 2, are held in a surrounding outer groove 16 on a radially outer circumferential surface 18 of the interior part 6. A small clear gap exists between a groove base 30 and radially inner circumferential surfaces of the lamellar rings 14. By their radially outer circumferential surfaces, the lamellar rings 14 are tensioned against the radially inner circumferential surface 20 of the bell part 12. The radially inner circumferential surface 20 of the bell part 12 and the radially outer circumferential surface 18 of the inner part 6 are constructed as concave spherical segment surfaces or as concavely spherical surfaces, as illustrated in FIG. 2. In this context, "spherical" applies to any surface with a curved cross-section which deviates from a cylindrical shape. In technical terminology, such a surface is also called a "bowed" surface. The spherical segment surfaces 18, 20 are constructed in a complementary fashion and have essentially identical radii.

Figure 6:
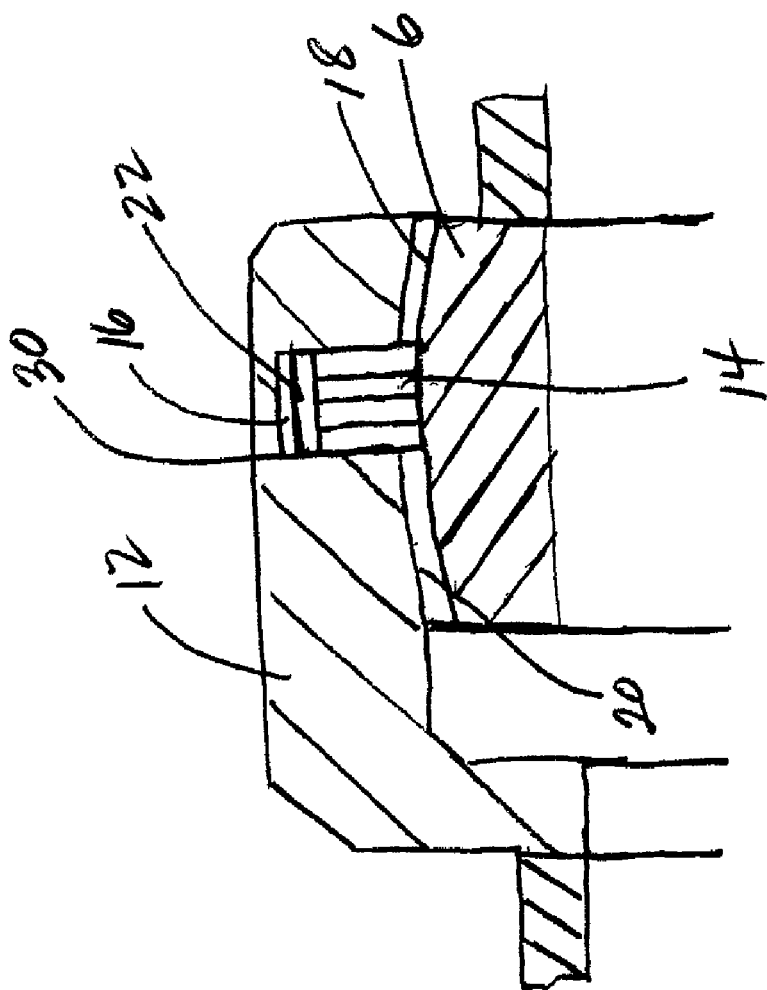
FIG. 6 is an enlarged view of another embodiment of a pipe connection, similar to FIG. 4, according to the present disclosure.

It is within the scope of the present disclosure that, as an-alternative, that the annular groove 16, in which the lamellar rings 14 are held, could also be constructed in the bell part 12, as shown in FIG. 6, and a working diameter of the lamellar rings 14 could be formed by the radially outer circumferential surface 18 of the interior part 6. Furthermore, a surface carrying the lamellar rings 14 on the interior part 6 or on the bell part 12 could have a cylindrical construction if an opposite surface on the bell part 12 or on the interior part 6, which then forms the working diameter for the lamellar rings 14, were constructed as a concave spherical-segment surface or as a concave spherical surface. By such a pipe connection 1 in the form of a ball-and-socket joint or a partial ball-and-socket joint, an angle compensation of, for example, up to 10 degrees can be achieved.

The radii of the two spherical-segment surfaces 18, 20 on the bell part 12 and on the interior part 6, as well as their axial length, are selected such that the interior part 6, together with the lamellar rings 14, which possibly may have to be radially compressed, can be inserted into the bell part 12 without having to construct the bell part 12 in several parts. For assembly-related reasons, the spherical-segment surfaces 18, 20 also each lead out directly at free edges of the interior part 6 or of the bell part 12 without, for example, an adjoining cylindrical section, which could hinder an assembly operation.

Several single-wound lamellar rings 14 of the same type may be arranged axially behind one another in the outer groove 16, which may be desirable with respect to a multiple deflection of the flow of the pressure medium. Such single-wound lamellar rings 14 include a steel band extending in a plane and have an axial abutting opening. As a result of the construction of a working diameter as a spherical-segment surface 20 or as a spherical surface, the lamellar rings 14 deform differently in a radial direction and have different outside diameters respectively.

It is within the scope of the present disclosure that double-winding lamellar rings can be used. In such case, ends of the double windings, in a relaxed condition of the double-winding lamellar ring, deviating from a circular shape formed by the remainder of the double-winding lamellar ring, project toward an interior or toward an exterior and, in the tensioned condition of the double-winding lamellar ring, are aligned with this circular shape. The ends projecting toward the inside or outside with respect to the circular shape provide that, in an installed condition, the double windings are pressed toward the outside or toward the inside. The roundness of the closed double winding over 360 degrees ensures a firm contact with the groove base 30 of the outer groove 16 or with the working diameter 20.

In the embodiment shown in FIGS. 3, 4, 5, and 6, parts which remain the same and have the same effect with respect to the preceding embodiment of FIGS. 1 and 2, have the same reference numbers. In contrast to the embodiment of FIGS. 1 and 2, at least one tensioning ring 22 supported on the groove base 30 is held in the outer groove 16. Tensioning ring 22 may generate an elastic prestressing of, for example, four lamellar rings 14 against the radially inner surface 20 of the bell part 12.

Figure 5:
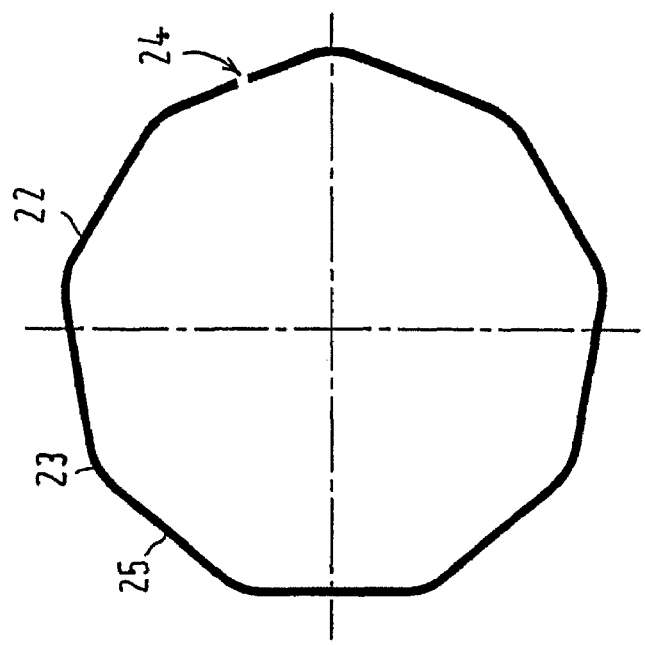
FIG. 5 is a view of the tensioning ring in the pipe connection of FIG. 3.
Figure 4:
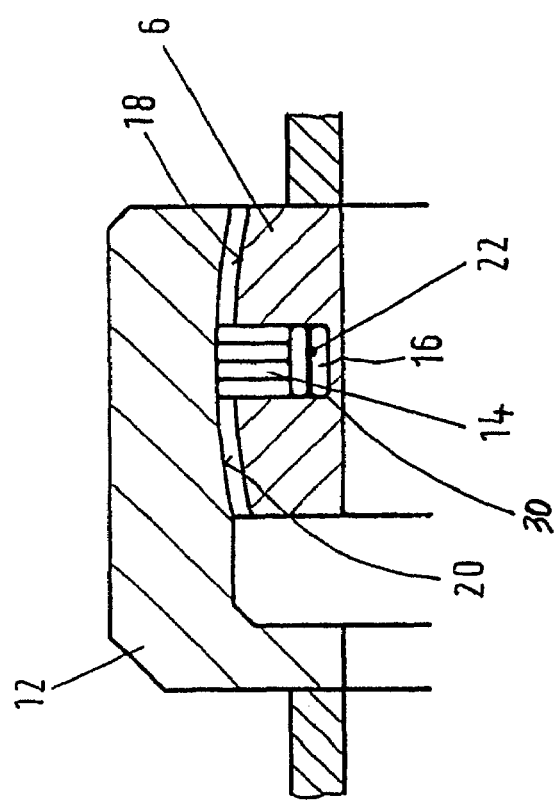
FIG. 4 is an enlarged view of the pipe connection of FIG. 3 in a straight position

Tensioning ring 22 has the same width as the outer groove 16 and has a polygonally open construction. That is, tensioning ring 22 has at least two corners 23, but may have nine corners 23, as shown in FIG. 5. Straight sections 25 are connected with one another in an angular fashion and do not extend completely over 360 degrees but has an opening 24. When mounting the lamellar rings 14 in the outer groove 16, the tensioning ring 22 is radially compressed, whereby its ends assigned to the opening 24 approach one another and enlarge the angles formed between the straight sections 25. The elastic, radially outward directed prestressing of the lamellae 14 is thereby generated against the radially inner circumferential surface 20 of the bell part 12. Under a radial pressure, as created, for example, by vibrations of the bell part 12 with respect to the interior part 6, this elastic prestressing can prevent a contact of the bell part 12 with the interior part 6.

It is within the scope of the present disclosure that many types of lamellar rings, even mutual combinations, can be used for sealing off the pipe connection 1.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A pipe connection for exhaust pipes of internal-combustion engines, the pipe connection having an axial and radial plug and an angle compensation, the pipe connection comprising:
   a first pipe;
   a second pipe;
   an interior part at an end of the first pipe, the interior part being enveloped by a bell part at an end of the second pipe;
   at least one lamellar ring being held in an annular groove in (a) a radially outer surface of the interior part and tensioned against the radially inner surface of the bell part or (b) a radially inner surface of the bell part and tensioned against the radially outer surface of the interior part;
   the radially outer surface of the interior part or the radially inner surface of the bell part being constructed as a concave surface;
   the at least one lamellar ring being tensioned against the concave surface;
   at least one tensioning ring being supported on a groove base of and held in the annular groove, the at least one tensioning ring generating an elastic prestressing of the at least one lamellar ring against (a) the radially inner surface of the bell part or (b) the radially outer surface of the interior part; and
   the at least one tensioning ring includes polygonal shape including an opening.

2. The pipe connection according to claim 1, wherein the at least one lamellar ring is held in the annular groove of the interior part and is tensioned against the radially inner surface of the bell part, and one of the radially inner surface of the bell part and the radially outer surface of the interior part being constructed as a concave spherical-segment surface and the other of the radially inner surface of the bell part and the radially outer surface of the inner part being constructed as a convex spherical-segment surface.

3. The pipe connection according to claim 2, wherein radii of the spherical-segment surfaces are substantially complementary.

4. The pipe connection according to claim 1, wherein the at least one lamellar ring includes several lamellar rings arranged axially behind one another in the annular groove.

5. The pipe connection according to claim 1, wherein the at least one lamellar ring is a single-wound lamellar ring having an axial abutting opening made of a steel band extending in a plane.

6. The pipe connection according to claim 1, wherein the at least one lamellar ring is a double-winding lamellar ring made of a steel band or another metal, and ends of double windings in a relaxed condition of the double-winding lamellar ring projecting toward the inside or toward the outside, the ends deviating from a circular shape formed by a remainder of the double-winding lamellar ring and, in a tensioned condition of the double-winding lamellar ring, the ends being aligned with this circular shape.

7. The pipe connection according to claim 1, wherein the interior part or the bell part is produced as a separate component and is fastened to an end of the first pipe or the second pipe.

8. The pipe connection according to claim 1, wherein the tensioning ring includes at least two corners.

9. The pipe connection according to claim 8, wherein the polygonal shape of the tensioning ring includes straight sections which are connected with one another in an angular fashion.

10. The pipe connection according to claim 9, wherein the straight sections do not form a closed polygon.

* * * * *